United States Patent
Cowan et al.

[11] Patent Number: 5,965,960
[45] Date of Patent: Oct. 12, 1999

[54] ELECTRONIC LIMIT SWITCH SYSTEM

[75] Inventors: Allan L. Cowan, Stockbridge; Mark W. Mierzwa, Manchester, both of Mich.

[73] Assignee: Chrysler Corporation, Auburn Hills, Mich.

[21] Appl. No.: 09/050,526

[22] Filed: Mar. 30, 1998

[51] Int. Cl.⁶ .................................................. H01H 47/00
[52] U.S. Cl. ............................................ 307/125; 318/626
[58] Field of Search ............................ 307/125; 318/618, 318/628, 626; 388/824; 340/661

[56] References Cited

U.S. PATENT DOCUMENTS

| | | | |
|---|---|---|---|
| 3,539,897 | 11/1970 | Sommeria | 318/618 |
| 3,924,171 | 12/1975 | Ukai et al. | 318/663 |
| 4,341,986 | 7/1982 | Browder | 318/618 |
| 5,563,483 | 10/1996 | Kowall et al. | 318/683 |

*Primary Examiner*—Jeffrey Gaffin
*Assistant Examiner*—Ed Garlepp
*Attorney, Agent, or Firm*—Jennifer M. Stec

[57] ABSTRACT

A programmable, electronic switch system in which the upper and lower limits of travel of a moving device can be stored in the memory of a circuit. Once the upper and lower limits of travel have been programmed into the circuit, movement of the device causes a variable voltage to be output to the circuit. The variable voltage is compared against the upper and lower limits to determine if the voltage is within the range between the upper and lower limits or outside of one or either of the upper and lower limits.

5 Claims, 2 Drawing Sheets

ELECTRONIC LIMIT SWITCH SYSTEM

BACKGROUND OF THE INVENTION

1. Field of the Invention

The present invention relates generally to vehicles and limit switches and, more particularly, to a limit switch for application in test vehicles which experience extreme road conditions.

2. Description of the Related Art

In the field of vehicle testing, it is often necessary to expose vehicles to extreme road conditions using specially-designed test tracks and facilities in order to expedite durability testing. Many of these vehicle are driven by computer-controlled robots because road conditions are often severe and would not provide a comfortable ride for a human driver. To successfully implement the robotically driven vehicles, many of the robot actuators include limit switches in order to determine the limits of travel for the accelerator, service brake, shifter, and the like.

Because the severe road conditions result in severe road inputs and extreme load and vibration conditions, present limit switches do not provide the desired durability or reliability for such applications. Further, present limit switches are of limited use because of actuator travel speeds, space requirements, and adjustment constraints presented by durability vehicles outfitted with robot drivers.

Thus, it is desirable to provide a limit switch which withstands severe road conditions and in which the actuator limits may be varied in accordance with the specific application.

SUMMARY

A limit switch including a variable position potentiometer which provides an output voltage that varies in accordance with the position of a movable device. The potentiometer has first and second limit positions defining opposite end positions for a range of operation of the movable device. A first voltage output by the potentiometer corresponds to the first actuator limit, and a second voltage output by the potentiometer corresponds to the second actuator limit. The intermediate voltages between the limits correspond to a range of acceptable positions of the device. A first circuit compares the output voltage to the first voltage to determine if the output voltage is within an acceptable range or outside the first limit. The circuit indicates if the output voltage is outside the first limit. A second circuit compares the output voltage to the second voltage to determine if the output voltage is within an acceptable range or outside the second limit. The second circuit provides an output indicating if the output voltage is outside the second limit. The first and second circuits are programmable to vary the first and second limits.

Additional objects, features, and advantages of the present invention will become apparent in the following description and the appended claims taken in connection with the accompanying drawings.

DETAILED DESCRIPTION OF THE INVENTION

Figure 1:
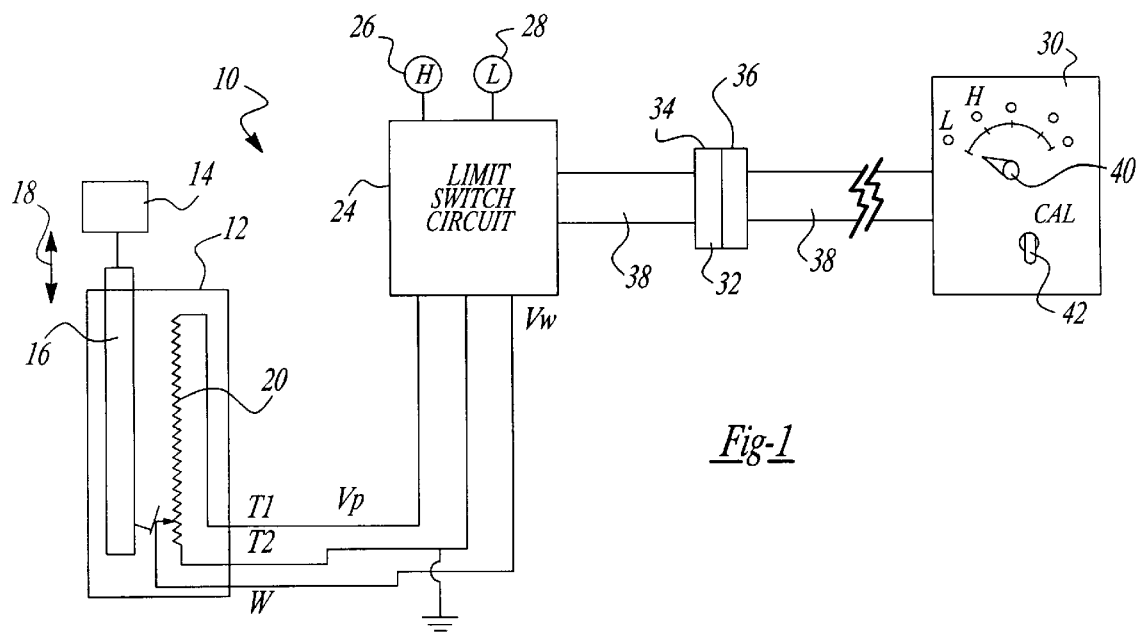
FIG. 1 is a block diagram of the electronic limit switch system arranged in accordance with the principals of the present invention.

With reference to FIG. 1, a block diagram of the electronic limit switch system 10 is shown. A potentiometer 12, which will be described as a linear potentiometer, is connected to the output of an actuator 14. The output of actuator 14 causes displacement of a wiper 16 in the direction of arrow 18. A voltage signal $V_H$ is applied across terminals T1 and T2 of a variable resistor 20 of potentiometer 12 by a limit switch circuit 24. Movement of actuator 14 displaces wiper 16 across variable resistor 20. Movement of wiper 16 across variable resistor 20 causes a corresponding change of the voltage output at wiper terminal W in accordance with the position of wiper 16 along variable resistor 20, as is known to those skilled in the art.

As will be described further herein, limit switch circuit 24 stores a high voltage limit $V_{HREF}$ and a low voltage limit $V_{LREF}$ which correspond to the position of wiper 16 when the wiper is at a desired predetermined high and low limits, respectively. The wiper 16 upper and lower limits correspond to the desired limits of travel for actuator 14. Limit switch circuit 24 compares the wiper voltage $V_w$ against stored reference voltages $V_{HREF}$ and $V_{LREF}$ to determine if the wiper 16 and attached actuator 14 are within a predetermined range. If wiper 16 and attached actuator 14 are outside the predetermined range, limit switch circuit 24 outputs a signal to indicate whether the wiper 16 has gone past the high voltage limit $V_{HREF}$ or low voltage limit $V_{LREF}$. Limit switch circuit 24 activates a high indicator 26 when the wiper 16 and attached actuator 14 moves outside of the acceptable range past the upper limit. Limit switch circuit 24 similarly activates a lower limit indicator 28 when the wiper 16 and attached actuator 14 falls outside of the acceptable range past the lower limit. Limit witch circuit 24 may be calibrated through use of a calibration box 30 which interconnects to limit switch circuit 24 via a connector 32 having male and female portions 34 and 36 respectively. The connector 32 interconnects ribbon cables 38 which are in turn connected to limit switch 24 and calibration box 30, respectively. As will be described further herein, calibration box 30 includes a selector switch 40 and a calibration switch 42 which enable calibration of either the upper or lower limit for the actuator 14.

Figure 3:
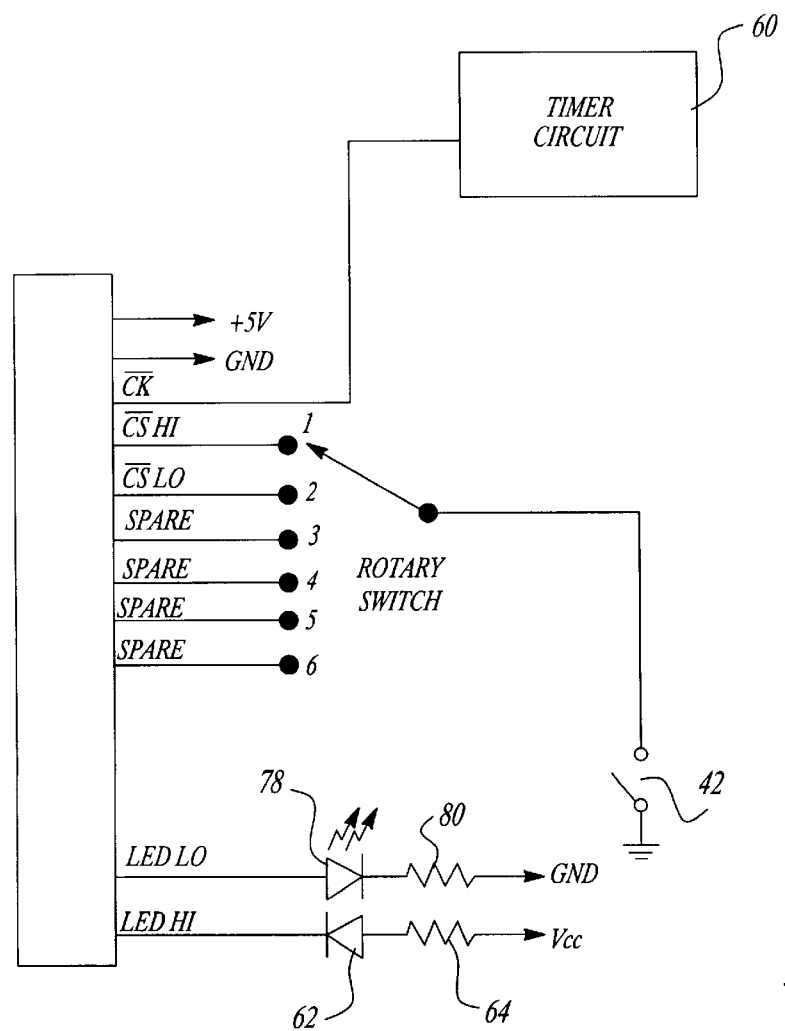
FIG. 3 is a schematic diagram of the calibration unit for the electronic limit switch.
Figure 2:
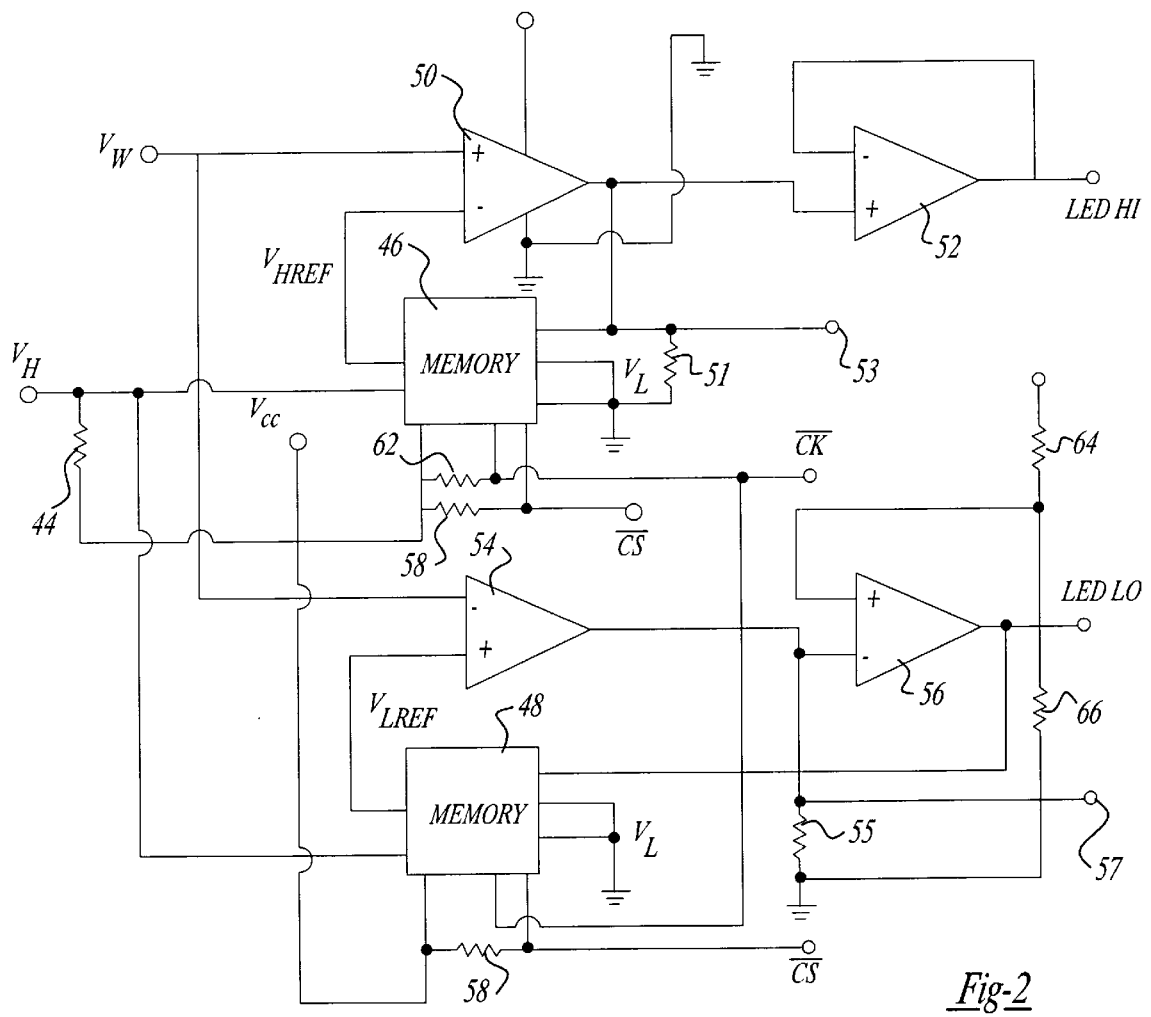
FIG. 2 is a schematic diagram of the circuit for implementing the electronic switch system.

With reference to FIGS. 2 and 3, operation of limit switch circuit 24 and calibration box 30 will be described. Limit switch circuit 24 is powered by a direct current (DC) voltage source $V_{CC}$ which is typically 5 volts. Limit switch circuit 24 is also grounded externally as is shown in FIG. 2. The input voltage $V_{CC}$ is applied across a resistor 44 which causes a voltage drop to provide an output voltage $V_H$ which is applied to terminal to T1, memory 46, and memory 48 high voltage $V_H$ is the highest voltage which may be output at wiper terminal W. A second voltage, the low voltage $V_L$ is also input to the respective memories 46 and 48. Memories 46 and 48 will be described herein as electronically erasable potentiometers ($E^2$ pots) which store a digital value equated with reference voltages $V_{HREF}$ and VLREF, respectively. The digital value relates to the voltage percentage between the $V_H$ and $V_L$. For example, assume that $V_L=0$ volts and $V_H=5$ volts and that $E^2$ pot 46 stores a digital value between 0 and 100. A digital value of 50 corresponds to an output voltage $V_{HREF}=2.5$ volts. Similarly, a digital value of 75 corresponds to an output voltage $V_{HREF}$ of 3.75 volts. Thus, the output voltages VHREF and $V_{LREF}$ are a function of the voltages $V_H$ and $V_L$ and the digital values stored in $E^2$ pots 46 and 48, respectively. $E^2$ pot 46 is used to compare the wiper voltage $V_W$ against the high reference voltage $V_{HREF}$, and $E^2$ pot 48 is used to compare the wiper voltage $V_W$ to the low reference voltage $V_{LREF}$, as will be described herein.

In operation, wiper voltage $V_W$ is compared against the high reference voltage $V_{HREF}$ output by $E^2$ pot 46. The wiper voltage $V_W$ is input to the positive terminal of a comparator 50. The high reference voltage $V_{HREF}$ from $E^2$ pot 46 is input to the negative terminal of comparator 50. Comparator 50 is powered by reference voltage $V_{CC}$ and grounded, as is known to those skilled in the art. If the wiper voltage $V_W$ is greater than the high reference voltage $V_{HREF}$, comparator 50 outputs a high voltage signal to buffer 52. Buffer 52 amplifies and outputs the high voltage signal to indicate that the wiper 16 and attached actuator 14 have exceeded the desired limit of travel in the high direction. The signal output by buffer 52 may be used as an input to an electronic circuit which may generate corrective control signals in response to actuator 14 exceeding its limit of travel or may activate a visual indicator, such as indicator 26 to notify an operator. If the wiper voltage $V_W$ is less than $V_{HREF}$, comparator 50 outputs a voltage low signal which is correspondingly output by buffer 52. The voltage low signal indicates that the position of the wiper and attached actuator is within an acceptable. A resistor 51 connects the output of comparator 50 to ground so that the output voltage of comparator 50 may be tested at terminal 53.

Similarly, the wiper voltage $V_W$ is also compared against the low reference voltage $V_{LREF}$ to determine whether the wiper 16 and attached actuator 14 have exceeded the desired lower limit of travel. More particularly, the reference voltage $V_{LREF}$ is input to the positive terminal of a comparator 54. The wiper voltage $V_W$ is input to the negative terminal of comparator 54. If wiper voltage $V_W$ is less than low reference voltage $V_{LREF}$, comparator 54 outputs a voltage high signal to the negative terminal of comparator 56. Resistors 64 and 66 form a voltage divider of input voltage $V_{CC}$. The output of the voltage divider is an intermediate voltage between $V_{CC}$ and $V_L$ and is input to the positive terminal of comparator 56. When the output from comparator 54 is high, the output voltage from comparator 56 is low. The voltage low signal output by comparator 56 may be used as an input to an electrical circuit which may generate corrective control signals in response to actuator 14 exceeding its limit of travel or may active a visual indicator to notify an operator. If wiper voltage $V_W$ is greater than low reference voltage $V_{LREF}$, comparator 54 outputs a low voltage signal, causing comparator 56 to output a high voltage signal. A resistor 55 connects the output of comparator 54 to ground so that the output voltage of comparator 54 may be tested at terminal 57.

Referring to FIGS. 2 and 3, calibration of the $E^2$ pots 46 and 48 will be described. In order to calibrate $E^2$ pot 46 to store the digital value corresponding to high reference voltage $V_{HREF}$, indicating the upper limit for travel for the wiper 16 of potentiometer 12, the operator first connects calibration box 30 to limit switch circuit 24 via connector 36. Once the proper connection between limit switch circuit 24 and calibration box 30 is established, the operator then displaces actuator 14 to the desired upper limit of travel. Displacing actuator 14 to the desired upper limit of travel correspondingly displaces wiper 16 to the desired limit of travel and resultingly generates an output voltage $V_W$ which will be stored in $E^2$ pot 46 as the high reference voltage $V_{HREF}$. In order to store the $V_W$, the operator moves rotary switch 40 of calibration box 30 to the H setting.

As shown in FIG. 3, calibration box 30 receives power and ground signals from limit switch circuit 24. When rotary switch 40 is placed to the H setting, calibration switch 42 is connected to the chip select input $\overline{CS}$, which is input to $E^2$ pot 46. The input to $\overline{CS}$ of $E^2$ pot 46 is normally held high by $V_H$ and pull-up resistor 58. When $\overline{CS}$ of $E^2$ pot 46 is low, programming of $E^2$ pot 46 is enabled. The output of calibration switch 42 is normally high. When the operator presses the calibration switch 42, a transition from a high voltage to a low voltage occurs to enable programming of $E^2$ pot 46. A timer circuit 60 provides a clock signal $\overline{CK}$ which is input to $E^2$ pot 46. $\overline{CK}$ of $E^2$ pot 46 is normally held high by $V_H$ and pull-up resistor 62. When the clock signal $\overline{CK}$ transitions from a logic high to a logic low, the digital value stored in the memory of $E^2$ pot 46 is either incremented or decremented.

Incrementing or decrementing the digital value increases or decreases the high reference voltage $V_{HREF}$ in increments equal to the difference between $V_H$ and $V_L$ divided by the number of digital values which may be stored in $E^2$ pot 46, as described above. The input to pin I/D of $E^2$ pot 46 determines whether the digital value and the corresponding $V_{HREF}$ is incremented or decremented. When the input to pin I/D is high, the digital value and $V_{HREF}$ is increased. When the input to pin I/D is low, the digital value and $V_{HREF}$ are decreased. If high reference voltage $V_{HREF}$ is less than $V_W$, comparator 50 outputs a high signal which is input to pin I/D of $E^2$ pot 46. This increments the digital value stored in $E^2$ pot 46 upon a high to low transition of clock signal $\overline{CK}$. If high reference voltage $V_{HREF}$ is greater than the wiper voltage $V_W$, comparator output 50 outputs a low signal to pin I/D. This decrements the digital value stored in $E^2$ pot 46 and $V_{HREF}$ upon a high to low transition of clock signal $\overline{CK}$.

The output from comparator 50 is also input to buffer 52 which outputs an amplified signal. When the calibration box 30 is connected to limit switch circuit 24, the amplified signal is input to the negative terminal of a light emitting diode (LED) 62. The positive terminal of LED 62 is connected to a resistor 64 which is in turn connected to voltage source $V_{CC}$. When $V_{HREF}$ is less than wiper voltage $V_W$, the output from buffer 52 is high, causing LED 62 to be off. When high reference voltage $V_{HREF}$ is greater than wiper voltage $V_W$, the output from comparator 50 and buffer 52 is low, causing LED 62 to turn on. When $V_{HREF}$ alternately is greater than and less than the wiper voltage $V_W$, LED 62 blinks, indicating that the high reference voltage $V_{HREF}$ is within a digital count of the reference voltage of $V_W$. The operator then switches calibration switch 42 to the off setting, completing the calibration process. The high reference voltage $V_{HREF}$ has been programmed into $E^2$ pot 46.

Programming the lower reference voltage $V_{LREF}$ into $E^2$ pot 48 is performed similarly. After connecting limit switch circuit 24 and calibration box 30, the operator moves rotary switch 40 to the L position. The operator then moves actuator 14 and attached wiper 16 to the desired lower limit of travel. Displacing wiper 16 towards the lower limit of travel results in an output voltage $V_W$ which defines the desired low voltage limit $V_{HREF}$ output by potentiometer 12. When actuator 14 and wiper 16 are positioned, the operator places calibration switch 42 in the calibration position, which activates of programming of $E^2$ pot 48. Similarly as described above, while calibration switch 42 is in the calibration position, the digital value stored within $E^2$ pot 48 may be incremented or decremented to vary low reference voltage $V_{LREF}$. Low reference voltage $V_{LREF}$ corresponds to the digital value stored in E pot 48.

Low reference $V_{LREF}$ is compared to the wiper voltage $V_W$ to determine if the wiper voltage is greater than or less than $V_{LREF}$. If wiper voltage $V_W$ is greater than $V_{LREF}$, comparator 54 outputs a low voltage signal which is input to comparator 56. Comparator 56 outputs a high voltage signal which is input to the I/D pin of $E^2$ pot 48, which operates as described with respect to $E^2$ pot 46. A low voltage applied to the I/D pin of $E^2$ pot 48 decrements, the digital value stored in $E^2$ pot 48 upon the negative transition of clock signal $\overline{CK}$, which operates as described above with respect to $E^2$ pot 46. Decrementing the digital values stored in $E^2$ pot 48 decrements low reference voltage $V_{LREF}$. When low reference voltage $V_{LREF}$ drops below wiper voltage $V_W$, comparator 54 outputs a high voltage signal and comparator 56 outputs a high voltage signal. The high voltage signal is input to the I/D pin of $E^2$ pot 48 so that the stored digital value to be incremented which results in an increase in low reference voltage $V_{LREF}$. When low reference voltage $V_{LREF}$ increases above wiper voltage $V_W$, comparator 54 outputs a voltage high signal, causing comparator 56 to output a voltage low signal.

The output from comparator 56 is connected to the positive terminal of a light emitting diode (LED) 78. The negative terminal of LED 78 is connected to ground through a resistor 80. When the output from comparator 56 is high, indicating that the wiper voltage $V_W$ is less than the reference voltage $V_{LREF}$, LED 78 is activated.

Conversely, when the output from comparator 56 is low, indicating that the wiper voltage $V_W$ is less than the reference $V_{LREF}$, LED 78 is off. When LED 78 begins to blink, the reference voltage is alternatively above and below the wiper voltage $V_W$. This to indicates the operator that the digital code for the lower reference voltage $V_{LREF}$ has been programmed into $E^2$ pot 48. The operator then moves calibration switch 42 to the off position.

Once the operator has programmed both $E^2$ pots 46 and 48, the operator disconnects calibration box 30 and can optionally connect the male end of connector 36 to input the high voltage limit and low voltage limit signals to the appropriate circuits, As can be seen from the foregoing description, the circuit of the present invention enables the user to program the upper and lower limits of a limit switch depending on their particular application. Further, the limits can be increased or decreased as is necessary simply by reprogramming the stored limit in memory.

Although the invention has been described with particular reference with certain embodiments thereof, variations and modifications can be effected within the spirit and scope of the following claims.

What is claimed is:

1. A limit switch system, comprising:

a variable position potentiometer which provides an output voltage that varies in accordance with the position of an attached movable device, the potentiometer having first and second limit positions defining opposite end positions for a desired range of travel of the moveable device, wherein a first voltage corresponds to the first limit and a second voltage corresponds to the second limit to define a range of intermediate voltages corresponding to the range of the moveable device;

a first circuit for comparing the output voltage to the first voltage to determine if the output voltage is within the range or outside the first limit, the first circuit providing an output indicating if the output voltage is outside the first limit;

second circuit for comparing the output voltage to the second voltage to determine if the output voltage is within the range or outside the second limit, the second circuit providing an output indicating if the output voltage is outside the second limit, wherein the first and second circuits are programmable to vary the first and second limit.

2. The limit switch of claim 1 wherein:

the first circuit comprises a memory for storing the first limit; and the second circuit comprises a memory for storing the second limit.

3. The limit switch of claim 2 wherein the first circuit memory comprises an electrical erasable programmable memory which stores a digital value corresponding to the first limit, and the second circuit memory comprises an electrical erasable programmable memory which stores a digital value corresponding to the second limit.

4. The limit switch of claim 3 further comprising a calibration circuit for setting the first and second limits, the calibration circuit programming the erasable programmable memory for the first and second circuits.

5. The limit switch of claim 4 wherein the calibration circuit includes a first indicator which is actuated when the first limit has been stored in memory and a second indicator which is actuated when the second limit has been stored in memory.

\* \* \* \* \*